United States Patent [19]

Tomida et al.

[11] Patent Number: 5,359,784
[45] Date of Patent: Nov. 1, 1994

[54] METHOD OF CENTERING IN ROUNDNESS MEASURING INSTRUMENT AND SYSTEM THEREFOR

[75] Inventors: Miyoshi Tomida; Asao Matsumoto, both of Mitaka, Japan

[73] Assignee: Tokyo Seimitsu Co., Ltd., Tokyo, Japan

[21] Appl. No.: 3,871

[22] Filed: Jan. 11, 1993

Related U.S. Application Data

[63] Continuation-in-part of Ser. No. 877,197, May 1, 1992, abandoned.

[30] Foreign Application Priority Data

May 2, 1991 [JP] Japan .................. 3-100937

[51] Int. Cl.$^5$ .................. G01B 5/20; G01B 5/25
[52] U.S. Cl. .................. 33/550; 33/520; 33/645
[58] Field of Search .................. 33/550, 520, 533, 613, 33/644, 645, 549, 555

[56] References Cited

U.S. PATENT DOCUMENTS

| | | | |
|---|---|---|---|
| 3,125,811 | 3/1964 | Pierce et al. | 33/533 |
| 3,259,989 | 7/1966 | Wilson | 33/520 |
| 4,080,741 | 3/1978 | Siddall et al. | 33/645 |
| 4,208,157 | 6/1980 | Guarino et al. | 33/520 |
| 4,679,330 | 7/1987 | Williams | 33/550 |
| 4,890,421 | 1/1990 | Moore, Jr. et al. | 33/550 |
| 5,068,972 | 12/1991 | Herzog et al. | 33/549 |

Primary Examiner—Christopher W. Fulton
Attorney, Agent, or Firm—Sixbey, Friedman, Leedom & Ferguson

[57] ABSTRACT

A centering system in a roundness measuring instrument comprises a computing section, a detecting device and a programming device. The computing section seeks an average circle of an article to be measured, a value of eccentricity and a direction of an angle of eccentricity in response to a displacement signal of a forward end element, sets an output signal of a detector so that the position of the detector at the time the measurement element is present on the arc of the average circle becomes zero, and further, calculates only a displacement value of the measurement element in a direction of an X-axis or a Y-axis to the value of eccentricity. The detecting device detects an angle of rotation of an X-Y table in a direction of an angle of eccentricity of the X-axis or the Y-axis. Then, the X-Y table is moved in the direction of each of the X and Y-axis so that the value of eccentricity in the direction of each axis at the time the respective axis is rotated to reach a predetermined angle of rotation becomes zero, thus carrying out the centering. With this operation, the centering work is facilitated and even an unskilled operator can carry out the centering of the article to be measured in a short period of time.

20 Claims, 6 Drawing Sheets

METHOD OF CENTERING IN ROUNDNESS MEASURING INSTRUMENT AND SYSTEM THEREFOR

This application is a continuation-in-part of Ser. No. 07/877,197, filed May 1, 1992, now abandoned.

BACKGROUND OF THE INVENTION

1. Field of the Invention

This invention relates to a method of centering in a roundness measuring instrument and a system therefor, and particularly to a method of centering an article to be measured by the roundness measuring instrument and a system therefor.

2. Description of the Related Art

When roundness and the like of an article to be measured are measured by a roundness measuring instrument, after centering of the article to be measured is carried out, a detector of the roundness measuring instrument is abutted against the article to be measured and the article to be measured is rotated to measure the peripheral surface of the article to be measured, thereby measuring the roundness of the article to be measured. In this case, the centering of the article to be measured is carried out such that, after the article to be measured is rested on a rotatable X-Y table, the detector is abutted against the article to be measured on an X-axis of the X-Y table, the X-Y table is rotated through 180°, the X-Y table is moved in a direction of the X-axis by ½ of a displacement value of the detector at this time, subsequently, the detector is abutted against the article to be measured on a Y-axis of the X-Y table, the X-Y table is rotated through 180°, and the X-Y table is moved in a direction of the Y-axis by ½ of the displacement value of the detector at this time, to thereby carry out the centering of the article to be measured.

However, the conventional centering work presents such disadvantages that, since an operator moves the X-Y table by ½ of a displacement value of the detector by his own personal skill, it takes time, and further, that, since the centering work is carried out by the personal skill of the operator, a skilled operator for the centering work is required.

SUMMARY OF THE INVENTION

The present invention has been developed to obviate the above-described disadvantages and has its object the provision of a method of carrying out the centering in a roundness measuring instrument, in which even an unskilled operator can carry out the centering of an article to be measured in a short period of time and a system therefor.

To achieve the above-described object, the present invention is characterized in that, in the method of centering in the roundness measuring instrument wherein the article to be measured is rested on an X-Y table provided on a main body, a measurement element of the detector is abutted against the article to be measured, the X-Y table is rotated and roundness of the article to be measured is measured on the basis of a displacement of the forward end element, an average circle of the article to be measured, a value of eccentricity of the article to be measured and a direction of an angle of eccentricity are sought in response to a displacement signal of the forward end element when the X-Y table rested thereon with the article to be measured is rotated, an output signal of the detector is set so that the position of detector becomes zero when the measurement element is present on the radius of the average circle, an angle of rotation for operation an X-axis and another angle of rotation for operating a Y-axis of the X-Y table are set, a movement value of the X-axis for making the value of eccentricity in the direction of the X-axis to be zero is calculated when the X-Y table is rotated and the angle of rotation of the X-Y table reaches the angle of rotation for operating an X-axis knob, the X-axis knob is operated to move the X-Y table by a value of the movement of the X-axis to thereby make the value of eccentricity in the direction of the X-axis to be zero, a movement value of the Y-axis for making the value of eccentricity in the direction of the Y-axis to be zero is calculated when the X-Y table is rotated and the angle of rotation of the X-Y table reaches the angle of rotation for operating a Y-axis knob, and the Y-axis knob is operated to move the X-Y table by a value of the movement of the Y-axis to thereby make the value of eccentricity in the direction of the Y-axis to be zero, thus carrying out the centering of the article to be measured.

According to the present invention, a displacement signal from the measurement element of the detector at the time the X-Y table is rotated is input into a computing section, whereby the average circle of the article to be measured, a value of eccentricity between the rotary center of the X-Y table and the center of the article to be measured and a direction of an angle of eccentricity are sought. Subsequently, the output signal from the detector is set so that the position of the detector at the time the measurement element is present on the radius of the average circle becomes zero. Furthermore, the computing section outputs only the value of eccentricity in the direction of the X-axis or the Y-axis on the basis of the value of eccentricity of the article to be measured, which is measured by the detector. Further, a detecting means detects the angle of rotation of the X-Y table and outputs a detection signal when the X-axis or the Y-axis of the X-Y table reaches a predetermined angle of rotation. The X-Y table is adjusted in the direction of the X-axis or the Y-axis when the detection signal is output. Then, a predetermined angle of rotation in the direction of the angle of eccentricity in the direction of the X-axis or the Y-axis is previously input into a programming means, and the computing section calculates only the value of eccentricity in the direction of the X-axis or the Y-axis on the basis of the value of eccentricity of the article to be measured, which is measured at the time of this predetermined angle of rotation and the value thus calculated is displayed on a display section.

Accordingly, first, the X-Y table is rotated manually and stopped at a position where the X-axis knob reaches a position of adjustment. In this state, the X-axis knob is operated with the value of eccentricity in the direction of the X-axis, which is displayed on the display section, being watched, and the X-Y table is moved in the direction of the X-axis so that the value of eccentricity in the direction of the X-axis becomes zero. Subsequently, the X-Y table is rotated manually and stopped at a position where the Y-axis knob reaches a position of adjustment. In this state, the Y-axis knob is operated with the value of eccentricity in the direction of the Y-axis, which is displayed on the display section, being watched, to move the X-Y table in the direction of the Y-axis so that the value of eccentricity in the direction of the Y-axis becomes zero, so that the centering adjustment of the article to be measured in completed.

Furthermore, the centering system in the roundness measuring instrument according to the present invention is applicable to a roundness measuring instrument of the type in which the detector is rotated without being limited to the roundness measuring instrument of the type in which the X-Y table is rotated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of a method of centering in a roundness measuring instrument and a system therefor according to the present invention with reference to the accompanying drawings.

Figure 1:
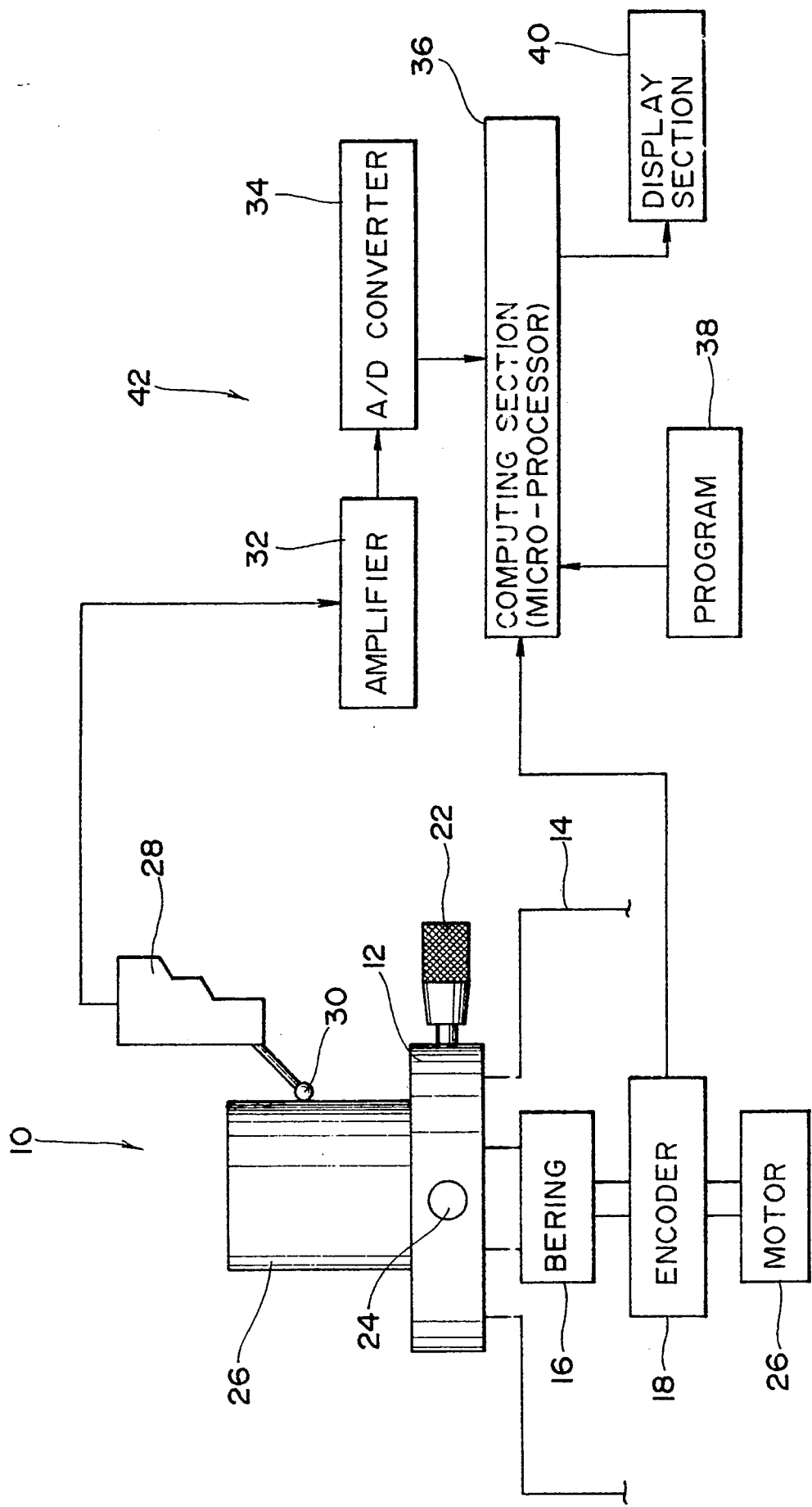
FIG. 1 is a schematic view showing the centering system in the roundness measuring instrument according to the present invention.

Referring to FIG. 1, an X-Y table 12 of a roundness measuring instrument 10 is rotatably provided on a main body 14. A motor 20 is connected to the X-Y table 12 through a bearing 16 and an encoder 18, and the X-Y table 12 is rotated when the motor 20 is driven. Further, the X-Y table 12 is provided with an X-axis knob 22 and a Y-axis knob 24, and the X-Y table 12 is moved in a direction of the X-axis when the X-axis knob 22 is operated and moved in a direction of the Y-axis when the Y-axis knob 24 is operated. Furthermore, an article to be measured 26 is rested on the X-Y table 12, and a measurement element 30 of a detector 28 is abutted against the article to be measured 26.

A centering system 42 in the roundness measuring instrument is constituted by a computing section 36, a programming section 38 and the like, and a displacement signal of the measurement element 30 is input into the computing section 36 through the detector 28, an amplifier 32 and an A/D converter 34. Furthermore, a rotary angle signal of the X-Y table 12 is input into the computing section 36 from the above-mentioned encoder 18, and further, information which will be described hereunder is input into the computing section 36 from a programming section 38. The computing section 36 calculates the values of eccentricity in the directions of the X-axis and the Y-axis on the basis of the thus input data.

The programming section 38 is set to output a detection signal when respective angle $\theta$ of the X-axis 22 and the Y-axis 24 reach a predetermined angle (preferably less than 45°) during rotation of the X-Y table 12. Here, the angle $\theta$ shows an angle in a direction of measuring of the forward end element 30 during the rotation of the X-Y table 12, i.e., an angle from a point A (Refer to FIG. 2) at which the measurement element 30 comes into contact with the article to be measured 26 to the X-axis knob 22 or the Y-axis knob 24. Incidentally, a display section 40 displays the values of eccentricity in the directions of the X-axis and the Y-axis, which are calculated by the computing section 36.

Figure 2:
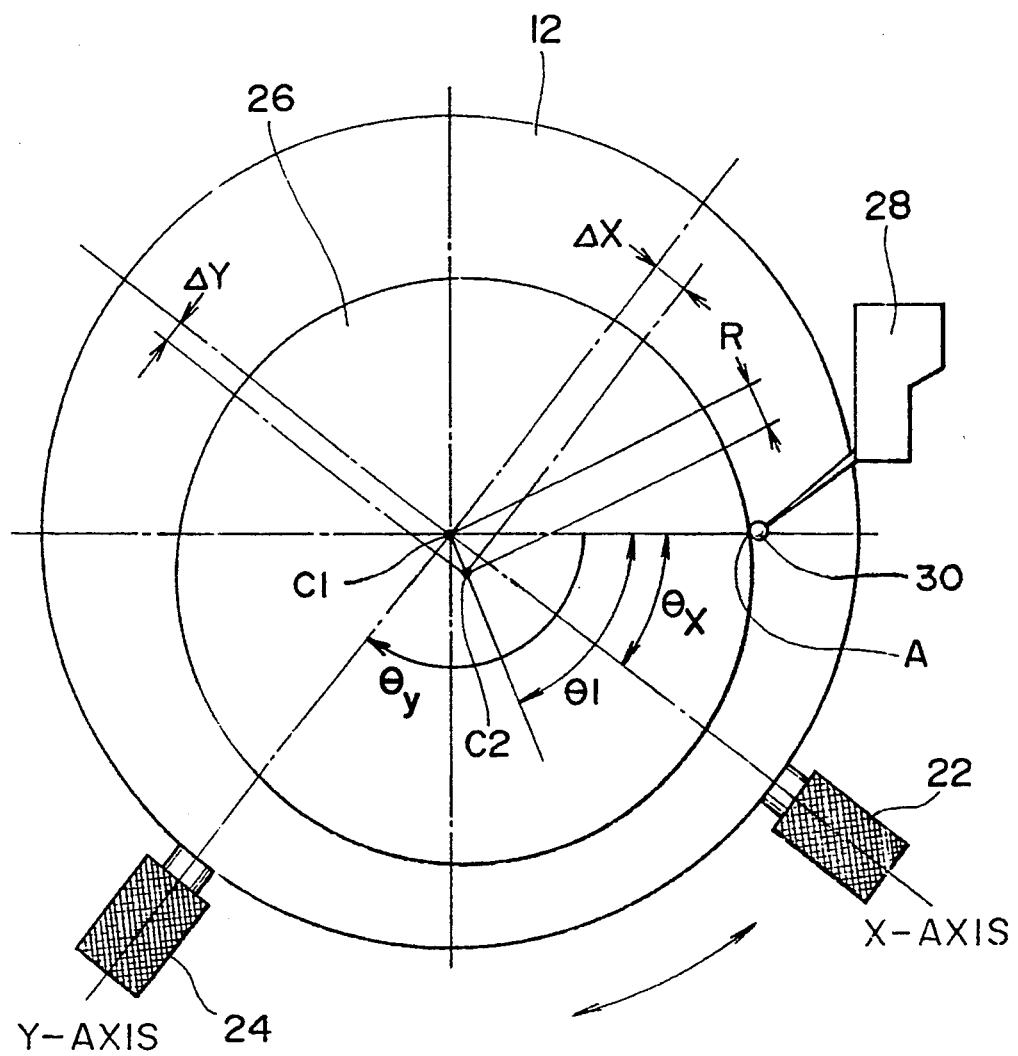
FIG. 2 is an explanatory view showing the method of centering, in which the centering system in the roundness measuring instrument is used.
Figure 3:
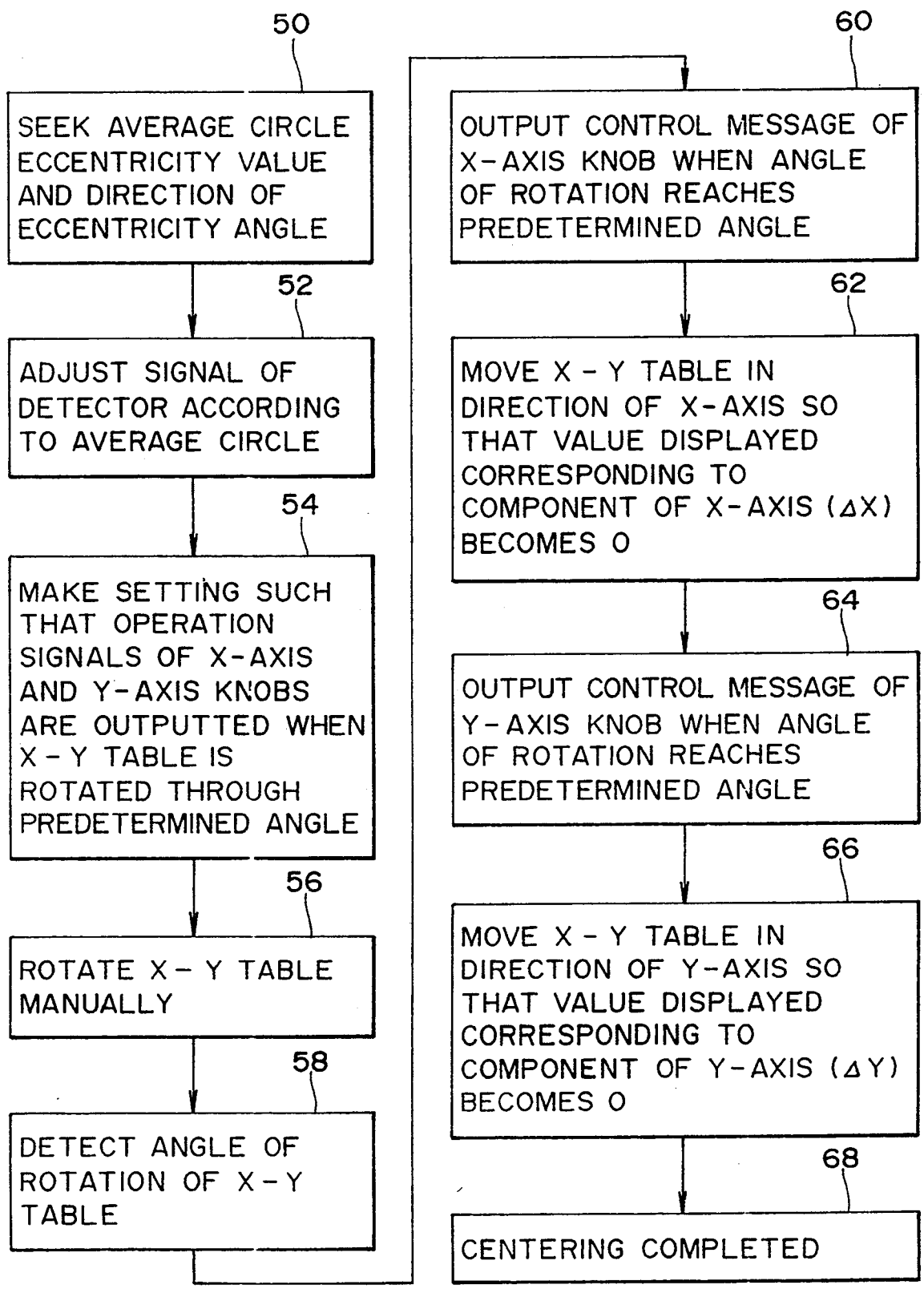
FIG. 3 is a flow chart of the method of centering, in which the centering system in the roundness measuring instrument is used.

Action of the centering system in the round measuring instrument constituted as described above will be described with reference to the plan view in FIG. 2 and the flow chart in FIG. 3.

First, the article to be measured 26 is rested on the X-Y table 12, the measurement element 30 of the detector 28 is abutted against the article to be measured 26, and the X-Y table 12 is rotated one turn manually. In this case, the deflection of the measurement element 30 is input into the computing section 36 through an amplifier 32 and the A/D converter 34, and, in the computing section 36, the average circle of the article to be measured 26, a value of eccentricity R between a center C1 of the X-Y table 12 and a center C2 of the article to be measured 26 and a direction of an angle of eccentricity $\theta 1$ are sought (Step 50).

The computing section 36 shifts a signal of the detector 28 so that the signal of the detector 28 on the radius of an average circle sought in Step 50 becomes zero. That is, an offset signal in input so that the signal of the detector 28 becomes zero when the measurement is element 30 present on the arc of the average circle (Step 52). With this operation, only the value of eccentricity R of the article to be measured 26 is displayed on the display section 40, so that the value of eccentricity R can be readily known.

Subsequently, the programming section 38 is operated to be set such that the respective angles $\theta$ are detected to output detection signals when the respective angles $\theta$ (Refer to FIG. 2) of the X-axis knob 22 and the Y-axis knob 24 reach predetermined angles less than 45° during the rotation of the X-Y table 12 (Step 54).

At this time, the computing section 36 calculates a value of deflection $\Delta X = R\cos(\theta 1 - \theta_x)$ of the element 30 in the direction of the X-axis and value of deflection $\Delta Y = R\sin(\theta 1 - \theta_y)$ of the measurement element 30 in the direction of the Y-axis on the basis of data of the value of eccentricity R, the angle of eccentricity $\theta 1$ and the angle $\theta$, and the thus calculated value $\Delta X$ and $\Delta Y$ are displayed on the display section 40.

Subsequently, the X-Y table 12 together with the article to be measured 26 are rotated manually. In this case, the measurement element 30 is abutted against the article to be measured 26, whereby the value of deflection of the measurement element 30 is input into the computing section 36 through the amplifier 32 and the A/D converter 34 (Step 56). Furthermore, the respective angles $\theta$ of the X-axis knob 22 and the Y-axis knob 24 are constantly detected and input the computing section 36 during the rotation of the X-Y table 12 (Step 58).

When the angle $\theta_x$ of the X-axis knob 22 reaches the predetermined angle sought in Step 54, the programming section 38 outputs a message so as to operate the X-axis knob 22 (Step 60). In this case, ΔX of the measurement element 30 in the direction of the X-axis calculated by the computing section 36 is being displayed on the display section 40.

Accordingly, when the operation message is output, the operator operates the X-axis knob 22 so that the value ΔX displayed on the display section 40 becomes zero. With this operation, a center C2 of the article to be measured 26 is moved in the direction of C1 in parallel to the axial line of the X-axis knob 22 to be positioned on the axial line of the Y-axis knob 24 (Step 62).

After the operation of the X-axis knob 22, the X-Y table 12 is rotated manually again, and, when the angle $\theta_y$ of the Y-axis knob 24 reaches the predetermined angle sought in Step 54, the programming section 38 outputs a message so that the Y-axis knob 24 is operated (Step 64). In this case, ΔY of the measurement element 30 in the direction of the Y-axis calculated by the computing section 36 is being displayed on the display section 40.

Accordingly, when the operation message is output, the operator operates the Y-axis knob 24 so that the value ΔY displayed on the display section 40 becomes zero. With this operation, the X-Y table together with the center C2 of the article to be measured 26 move along the axial line of the Y-axis knob 24 to C1 (Step 66), and the centering is completed (Step 68).

In this way, first, the X-Y table is rotated at least once and a value of deflection ΔX in the direction of the X-axis and a value of deflection ΔY in the direction of the Y-axis are displayed individually. Next, the X-axis knob is adjusted by the rotation of the X-axis through $\theta_x$ and the Y-axis knob is adjusted by the rotation of the Y-axis through $\theta_y$, then, the centering of the article is performed. Therefore, the first operations of the X-axis knob based on ΔX and the Y-axis knob based on ΔY perform the centering of the article to be measured, i.e., the centering of the article to be measured is performed by only a single operation of each of the X-axis and Y-axis knobs on an individual basis.

A method, in which the X-axis knob 22 in Step 62 is operated so as to make the displayed value ΔX to be zero will be described hereunder in detail. First, when the X-axis knob 22 is operated, the X-Y table 12 together with the article to be measured 26 move in the direction of C1 in parallel to the axial line of the X-axis knob 22. Furthermore, the measurement element 30 is abutted against the article to be measured 26, whereby the measurement element 30 is displaced in the direction of an X1-X2 axis in FIG. 2 as the article to be measured 26 moves, and this displacement value $x_1$, is input into the computing section 36.

When the displacement value $x_1$, is input, the computing section 36 calculates the current value of deflection ΔX in the direction of the X-axis of the measurement element 30 on the basis of the following equation (1).

$$\Delta X(\text{current}) = (\Delta X - x_1) \cos \theta_x \quad (1)$$

Then, the computing section 36 substitutes the known ΔX for the current value of deflection ΔX, and displays it on the display section 40. Then, while the X-axis knob 22 is operated, display processes from the operation processes of the X-axis knob 22 to the display section 40 are successively repeated.

Accordingly, at the time of operating the X-axis knob 22, the current value of deflection ΔX in a state of being changed by the operation of the X-axis knob 22 is constantly displayed on the display section 40. With this operation, when the operator operates the X-axis knob 22 to make the current value of deflection ΔX displayed on the display section 40 to be zero, the center C2 of the article to be measured 26 is disposed on the axial line of the Y-axis knob 24.

After the operation of the X-axis knob 22 in Step 62 is completed, the X-Y table 12 is rotated manually again. Then, when the angle $\theta_y$ of the Y-axis knob 24 reaches a predetermined angle sought in Step 54, a message for operating the Y-axis knob 24 is output from the programming section 38 (Step 64). At this time, the computing section 36 calculates the value of deflection $\Delta Y = R \sin(\theta_1 - \theta_y)$ in the direction of the Y-axis of the measurement element 30 on the basis of the data including the value of eccentricity R and the angle of eccentricity $\theta_1$, which are sought in Step 50, and the data of the value of deflection of the measurement element 30, which is input into the computing section 36 in Step 56, and the value of ΔY thus calculated is displayed on the display section 40.

Accordingly, when the operation message is output, the operator operates the Y-axis knob 24 so as to make the displayed value ΔY displayed on the display section 40 to be zero. With this operation, the X-Y table together with the center C2 of the article to be measured move to C1 along the axial line of the Y-axis knob 24 (Step 66).

A method, in which the Y-axis knob 24 in Step 66 is operated so as to make the displayed value ΔY to be zero, will be described hereunder in detail. First, when the Y-axis knob 24 is operated, the X-Y table 12 together with the article to be measured 26 move in the direction of C1 in parallel to the axial line of the Y-axis knob 24. In this case, the measurement element 30 is abutted against the article to be measured 26, whereby the measurement element 30 is displayed in the direction of the Y-axis in FIG. 2 as the article to be measured 26 moves, and this displacement value $Y_1$, is input into the computing section 36.

When the displacement value $Y_1$ is input, the computing section 36 calculates the current value of deflection ΔY on the basis of the following equation (2).

$$\Delta Y(\text{current}) = \Delta Y - y_1 X \sin \theta_y \quad (2)$$

Then, the computing section 3 substitutes the known ΔY for the current value of deflection ΔY thus calculated, and displays it on the display section 40. Then, while the Y-axis knob 24 is operated, display processes from the operation processes of the Y-axis knob 24 to be display section 40 are successively repeated.

Accordingly, at the time of operating the Y-axis knob 24, the current value of deflection ΔY in a state of being changed by the operation of the Y-axis knob 24 is constantly displayed on the display section 40. With this operation, when the operator operates the Y-axis knob 24 to make the current value of deflection ΔY displayed on the display section 40 to be zero, the center C2 of the article to be measured 26 moves to C1 along the axial line of the Y-axis knob 24.

Accordingly, when the operation of the Y-axis knob 24 is completed in Step 66, the center C2 of the article to be measured 26 coincides with the center of rotation C1 of the X-Y table 12, thus completing the centering (Step 68).

In the above embodiment, the values of deflection in a state of being changed during the operation of the knobs have been displayed on the display section 40 and the knobs have been operated so as to make the displayed values to be zero, however, the present invention should not necessarily be limited to this, and such a centering work may be adopted that only the values of deflection ΔX and ΔY are displayed and the X-Y table is moved by the personal skill of the operator without displaying the values of deflection in a state of being changed during the operation of the knobs.

Furthermore, in the above embodiment, first, when the angle $\theta_x$ of the X-axis knob 22 reaches the predetermined angle, the value of deflection ΔX in the direction of the X-axis is displayed and the X-axis knob 22 is operated so as to make the displayed value to be zero. Next, the X-Y table 12 is manually rotated again, and, when the angle $\theta_y$ of the Y-axis knob 24 reaches the predetermined angle, the value of deflection ΔY in the direction of the Y-axis is displayed and the Y-axis knob 24 is operated so as to make the displayed value ΔY to be zero, thus performing the centering of the article to be measured 26.

That is, after the respective angles $\theta$ of the X-axis knob 22 and the Y-axis knob 24 reach the predetermined angles, the respective knobs 22 and 24 are operated, whereby the operations of the X-axis knob 22 and the Y-axis knob 24 are discriminated from each other, however, the present invention should not necessarily be limited to this, and the discrimination between the operations of the X-axis knob and the Y-axis knob 24 may be performed by use of a change-over switch, a touch sensor and the like.

For example, in the case of the change-over switch, the operator operates the change-over switch, so that the operations between the X-axis knob 22 and the Y-axis knob 24 can be discriminated from each other. Accordingly, the Y-axis knob 24 can be operated after the operation of the X-axis knob 22 without manually rotating the X-Y table 12 again, Furthermore, in the above embodiment, when the measurement element 30 is present on the radius of the average circle, in response to the offset signal in Step 52, the detector is operated to be set to make the signal of the detector 28 to be zero and the display easy to read is obtained by making the zero point position of the display section 40 to be the reference portion, however, the present invention should not necessarily be limited to this, and the zero point position may not be offset so as to be the reference position.

In the above embodiment, the case where angles $\theta$ of either of the X- and Y-axis knobs are set below 45° have been described; however, the present invention should not necessarily be limited to this, and these angles $\theta$ may be set in a range of $-45° < \theta < +45°$ or $135° < \theta < 225°$.

Figure 4:
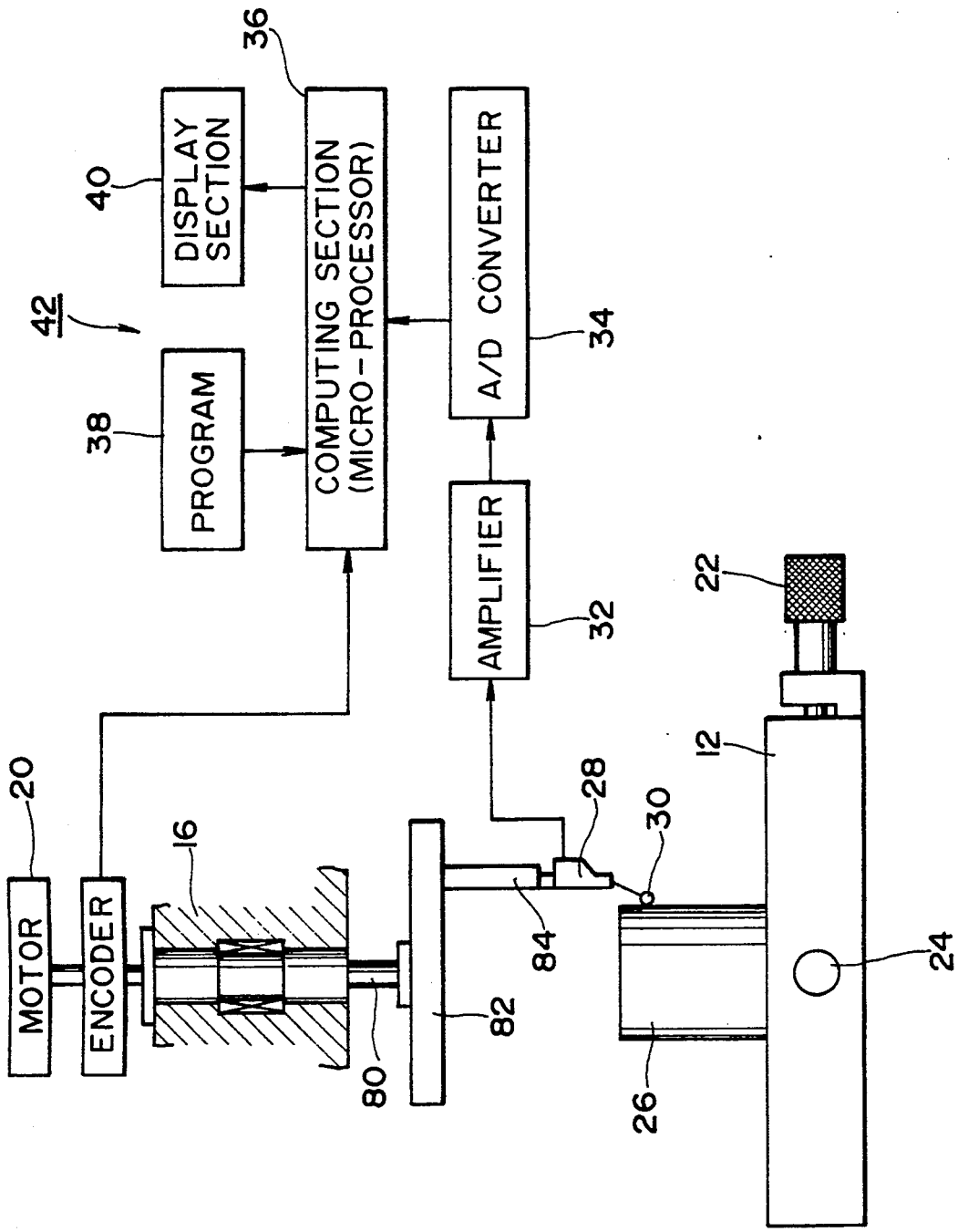
FIG. 4 is a schematic view showing another embodiment of the system for centering in the roundness measuring instrument according to the present invention.

In the above embodiment, description has been given of the type of the system for centering in the roundness measuring instrument, in which the X-Y table 12 is rotated, however, the system for centering in the roundness measuring instrument according to the invention of the present application should not necessarily be limited to this, and the type, in which the detector 28 is rotated as shown in another embodiment in FIG. 4 may be adopted. In this case, the X-Y table 12 may be of a fixed type. Construction of another embodiment of the system for centering in the roundness measuring instrument will hereunder be described with reference to FIG. 5. Incidentally, the same reference characters as shown in the above embodiment are used to designate same or similar parts in FIG. 5, so that the description thereof need not be repeated.

A shaft 80 is rotatably supported on the bearing 16. A central portion of a beam member 82 is secured to the bottom end of the shaft 80, and the detector 28 is provided on the right end portion of the beam member 82 through an arm 84. Accordingly, when the shaft 80 is rotated, the detector 28 moves on a circle centering about the shaft 80. With this operation, when the shaft 80 is rotated in a state, in which the measurement element 30 of the detector 28 is in contact with the outer circumference of the article to be measured 26, the measurement element 30 moves along the outer circumference of the article to be measured 26.

Figure 5:
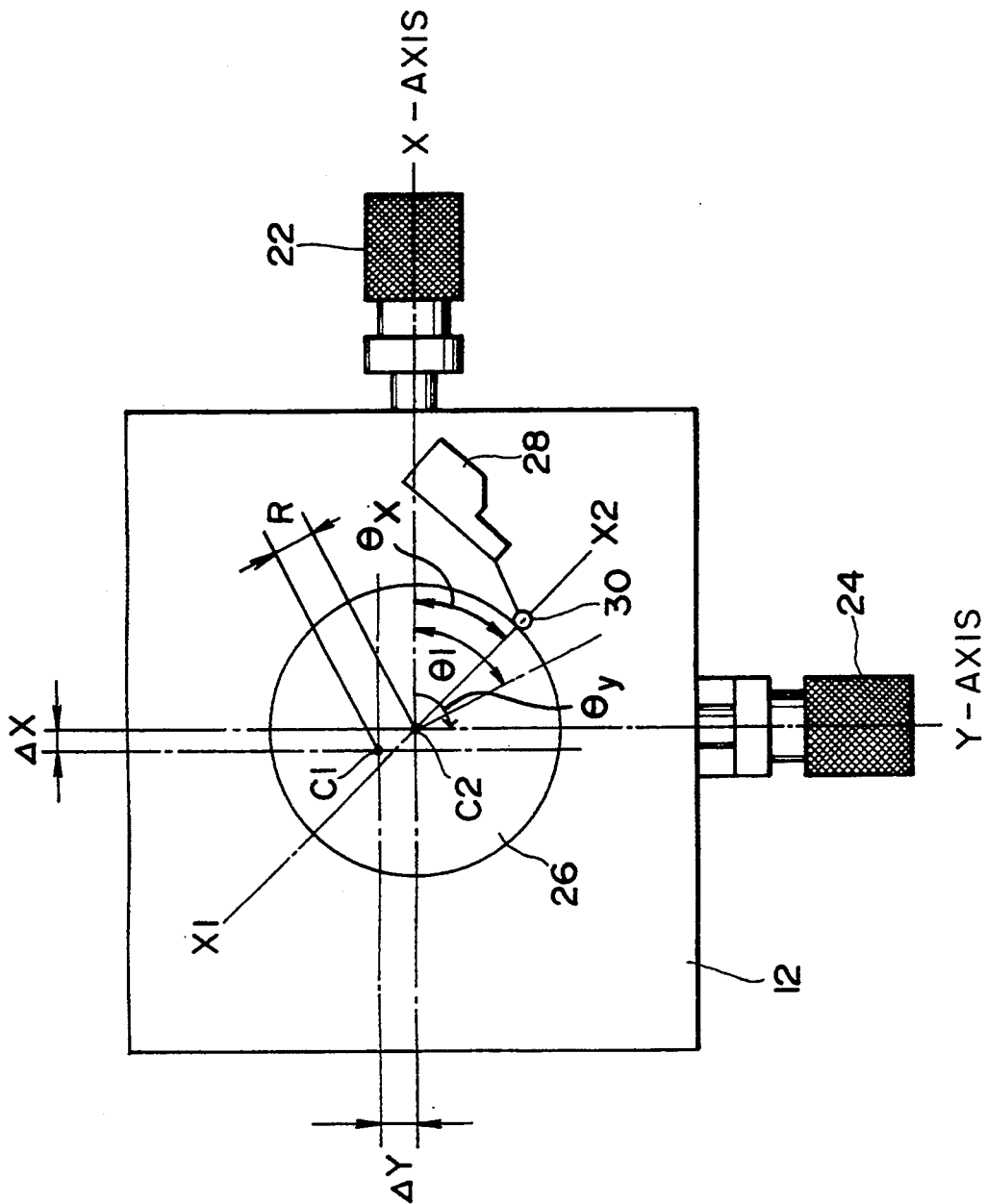
FIG. 5 is an explanatory view showing the method of centering, in which another embodiment of the system for centering in the roundness measuring instrument is used.
Figure 6:
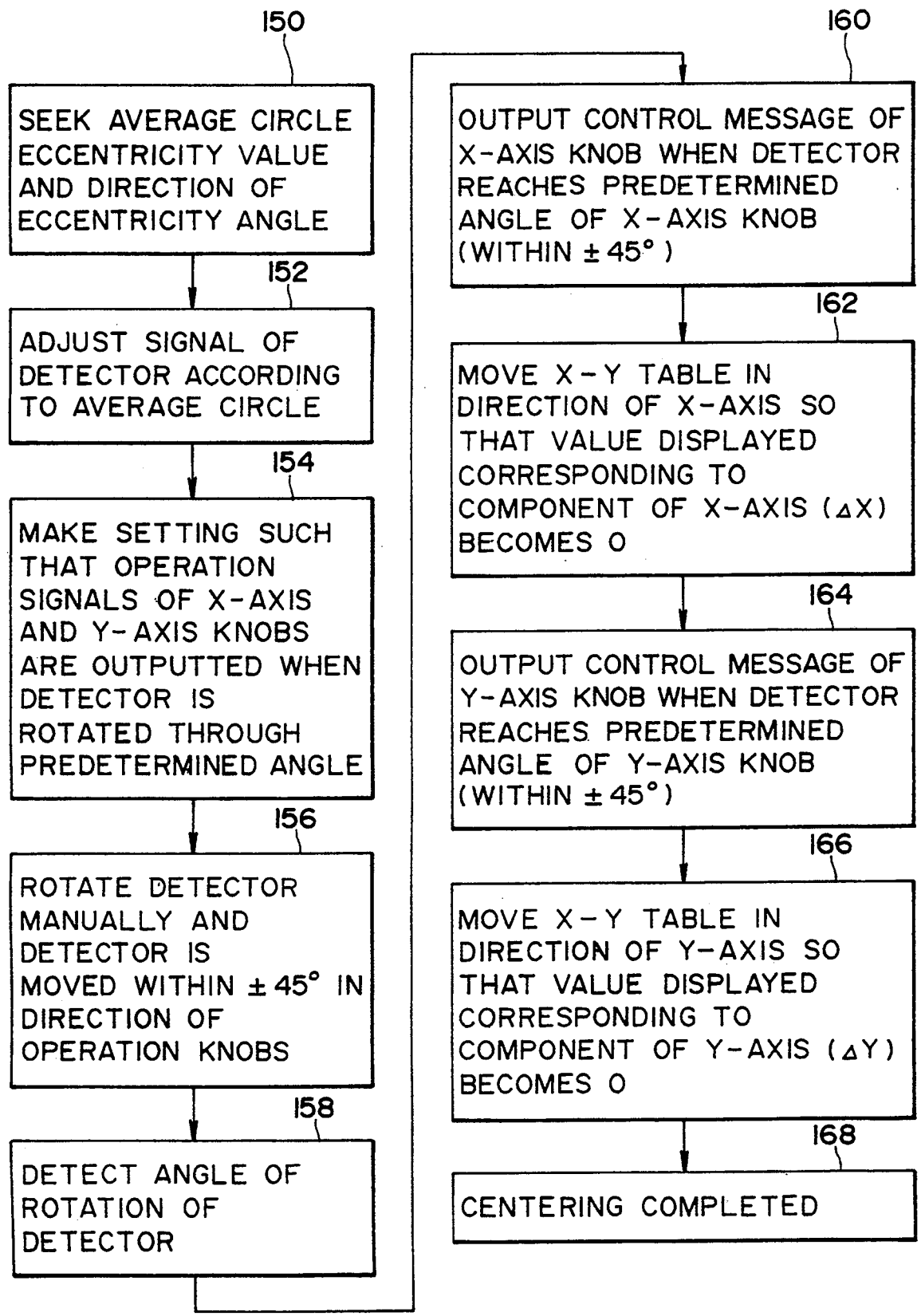
FIG. 6 is a flow chart of the method of centering, in which another embodiment of the system for centering in the roundness measuring instrument is used.

Action of another embodiment of the system for centering in the roundness measuring instrument constructed as described above will be described with reference to the planer view of FIG. 5 and the flow chart in FIG. 6.

First, the article to be measured 26 is rested on the X-Y table, the measurement element 30 of the detector 28 is abutted against the article to be measured 26, and the detector 28 is rotated one turn manually along the outer circumference of the article to be measured 26. In this case, the deflection of the measurement element 30 is input into the computing section 36 through the amplifier 32 and the A/D converter 34, and, in the computing section 36, the average circle of the article to be measured 26, the value of eccentricity R and the direction of the angle of eccentricity $\theta 1$ between the center of rotation C1 of the X-Y table 12 and the center of rotation C2 of the article to be measured 26 are sought (Step 150).

The computing section 36 shifts a signal of the detector 28 by the radius of the average circle sought in Step 50, so that the signal of the detector 28 becomes zero. That is, an offset signal is input such that the signal of the detector 28 becomes zero when the measurement element 30 is present on the radius of the average circle (Step 152). With this operation, only the value of eccentricity R of the article to be measured 26 is displayed on the display section 40, so that the value of eccentricity R can be easily known.

Next, the programming section 38 is operated to be set such that, when the respective angles $\theta$ (Refer to FIG. 5) from the X-axis knob 22 and the Y-axis knob 24 to the detector 28 reach predetermined values less than 45° during the rotation of the detection 28, upon detecting the respective angles $\theta$, the programming section 38 outputs a detection signal (Step 154).

Subsequently, the detector 28 is rotated manually. In this case, the measurement element 30 is abutted against the article to be measured 26, whereby the value of deflection of the measurement element 30 is input into the computing section 36 through the amplifier 32 and the A/D converter 34 (Step 156). Furthermore, during the rotation of the detector 28, the respective angles $\theta$ from the X-axis knob 22 and the Y-axis knob 24 to the detector 28 are constantly detected and input into the computing section 36 (Step 158).

Then, when the angle $\theta_x$ from the X-axis knob 22 to the detector 28 reaches the predetermined angle sought in Step 154, the programming section 38 outputs a message so as to operate the X-axis knob 22 (Step 160). At this time, the computing section 36 calculates the value of deflection in the direction of the X-axis $\Delta X = R\cos(\theta 1 - \theta_x)$ of the measurement element 30 on the basis of the data of the eccentricity R and the value of eccentricity $\theta 1$ which are sought in Step 150, the data of the value of deflection of the measurement element 30 which is input into the computing section 36 in Step 156, and the value $\Delta X$ thus calculated is displayed on the display section 40.

Accordingly, when the operation message is output, the operator operates the X-axis knob 22 such that the displayed value $\Delta X$ displayed on the display section 40 becomes zero. With this operation, the X-Y table 12 together with the center C2 of the article to be measured 26 move in the direction of C1 in parallel to the axial line of the X-axis knob 22 and is disposed on the axial line of the Y-axis knob 24 (Step 162).

A method, in which the X-axis knob 22 is operated in Step 162 so that the displayed value $\Delta X$ becomes zero will hereunder be described in detail. First, when the X-axis knob 22 is operated, the X-Y table 12 together with the article to be measured 26 move in the direction of C1 in parallel to the axial line of the X-axis knob 22. Furthermore, the measurement element 30 is abutted against the article to be measured 26, whereby the measurement element 30 is displaced along the X1–X2 axis along with the movement of the article to be measured 26 in FIG. 5, and this value of displacement $x_1$, is input into the computing section 36.

When the value of displacement $x_1$, is input, the computing section 36 calculates the current value of deflection $\Delta X$ in the direction of the X-axis of the measurement element 30 on the basis of the following equation (1) in the same manner as in the above embodiment.

$$\Delta X(\text{current}) = (\Delta X - x1) \cos \theta \tag{1}$$

Then, the computing section 36 substitutes the known $\Delta X$ for the current value of deflection thus calculated, and displays it on the display section 40. Then, while the X-axis knob 22 is operated, display processes from the operation processes of the X-axis knob 22 to the display section 40 are successively repeated. With this operation, when the operator operates the X-axis knob 22 to make the current value of deflection $\Delta X$ displayed on the display section 40 to be zero, the center C2 of the article to be measured 26 is disposed on the axial line of the Y-axis knob 24.

After completion of operation of the X-axis knob 22 in Step 162, when the detector 28 is rotated manually again and the angle $\theta_y$ from the Y-axis knob 24 to the detector 28 reaches the predetermined angle sought in Step 154, the programming section 38 outputs a message to operate the Y-axis knob 24 (Step 164). At this time, the computing section 36 calculates the value of deflection $\Delta Y = R\sin(\theta 1 - \theta_y)$ in the direction of the Y-axis of the measurement element 30 on the basis of the data of the value of eccentricity R and the angle of eccentricity $\theta 1$ and the data of the value of deflection of the measurement element 30 which is input into the computing section 36 in Step 156, and the value of $\Delta Y$ thus calculated is displayed on the display section 40.

Accordingly, when the operation message is output, the operator operates the Y-axis knob 24 so that the displayed value $\Delta Y$ displayed on the display section 40 becomes zero. With this operation, the X-Y table 12 together with the center C2 of the article to be measured 26 move along the axial line of the Y-axis knob 24 to C1 (Step 166).

The method, in which the Y-axis knob 24 is operated in Step 166 to make the displayed value $\Delta Y$ to be zero, will hereunder be described in detail. First, when the Y-axis knob 24 is operated, the X-Y table 12 together with the article to be measured 26 move in the direction of C1 in parallel to the axial line of the Y-axis knob 24. In this case, the measurement element 30 is abutted against the article to be measured 26, whereby the measurement element 30 is displaced along the X1–X2 axis along with the movement of the article to be measured 26 in FIG. 5, and this value of displacement $y_1$ is input into the computing section 36.

When the value of displacement $y_1$ is input, the computing section calculates the current value of deflection $\Delta Y$ in the direction of the Y-axis of the measurement element 30 on the basis of the following equation (2) in the same manner as in the above embodiment.

$$\Delta Y(\text{current}) = (\Delta Y - y_1) \sin \theta_y \tag{2}$$

Then, the computing section 36 substitutes the known $\Delta Y$ for the current value of deflection $\Delta Y$ thus calculated, and displays it on the display section 40. Then, while the Y-axis knob 24 is operated, display processes from the operation processes of the Y-axis knob 24 to be display section 40 are successively repeated.

Accordingly, at the time of operating the Y-axis knob 24, the current value of deflection $\Delta Y$ in a state of being changed by the operation of the Y-axis knob 24 is constantly displayed on the display section 40. With this operation, when the operator operates the Y-axis knob 24 to make the current value of deflection $\Delta Y$ displayed on the display section 40 to be zero, the center C2 of the article to be measured 26 moves to C1 along the axial line of the Y-axis knob 24.

Accordingly, when the operation of the Y-axis knob 24 is completed in Step 166, the center C2 of the article to be measured 26 coincides with the center of rotation C1 of the detector 28, so that the centering is completed (Step 168).

In this embodiment also, the change-over switch, the touch sensor and the like can be used in the same manner as in the above embodiment.

As has been described hereinabove, in the methods of centering in the roundness measuring instrument and the system therefor according to the present invention, when the X-Y table is rotated and the angle of rotation of the X-axis reaches the predetermined angle of rotation, the X-Y table is moved in the direction of the X-axis such that the value of eccentricity in the direction of the X-axis, which is output from the computing section, becomes zero, with the value of eccentricity in the direction of the X-axis, which is displayed on the display section, being watched. Subsequently, when the X-Y table is rotated such that the rotary angle of the Y-axis reaches the predetermined angle of rotation, the X-Y table is moved in the direction of the Y-axis such that the value of eccentricity in the direction of the Y-axis, which is output from the computing section, becomes zero, with the value of eccentricity in the direction of the Y-axis, which is displayed on the display section, being watched. With the above-described centering operations, the centering work of the article to be measured can be completed by only a single operation of each of the X-axis and Y-axis knobs on an individual basis.

Accordingly, the centering work of the article to be measured can be easily carried out, so that the centering of the article to be measured can be carried out in a short period of time even by the unskilled operator.

Furthermore, the centering system of the roundness measuring instrument according to the present invention should not necessarily be limited to the roundness measuring instrument of the type in which the X-Y table is rotated, and may be applied to the round measuring instrument of the type in which the detector is rotated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A method of centering in a roundness measuring instrument, which is applied to the roundness measuring instrument, in which an article to be measured is rested on an X-Y table rotatably provided on a main body, a measurement element of a detector is abutted against the article to be measured and the article to be measured is rotated through the X-Y table to measure the roundness of the article to be measured on the basis of a position of displacement of the measurement element, wherein an X-axis knob and a Y-axis knob, which are provided on the X-Y table, are operated such that the X-Y table is moved in directions of an X-axis and a Y-axis, whereby the center of the article to be measured is made to coincide with the center of rotation of the X-Y table, wherein said method comprises:

making the X-Y table, with the article to be measured rested thereon, to be rotated one turn or more, and shifting the center of the article to be measured between the directions of the X-axis and the Y-axis on the X-Y table from the center of rotation of the X-Y table on the basis of a displacement signal obtained during the rotation in accordance with the relationships:

$\Delta X = R \cos(\theta 1 - \theta_x)$ and $\Delta Y = R \sin(\theta 1 - \theta_y)$ where R is a radial value of eccentricity measured along a line between the center of the article to be measured and the center of the X-Y table, $\theta 1$ is an angle of eccentricity of the article relative to the X-Y table measured between said line and the measuring element of the detector, $\theta_x$ is an angle of the detector between the X-axis of the X-Y table and the measuring element of the detector, $\theta_y$ is an angle of the detector between the Y-axis of the X-Y table and the measuring element of the detector, and $\Delta X$ and $\Delta Y$ are the shifts of the center of the article to be measured relative to the center of rotation of the X-Y table along the X-axis and Y-axis, respectively;

displaying the shift of the article to be measured between the X-axis and the Y-axis on the X-Y table from the center of rotation of the X-Y table; and operating the X-axis knob and the Y-axis knob with the shift between the directions of the X-axis and the Y-axis, which is displayed, being watched;

whereby the centering of the article to be measured is performed by only a single operation of each of the X-axis and Y-axis knobs on an individual basis.

2. A method of centering in a roundness measuring instrument as set forth in claim 1, wherein, in said process of operating the X-axis knob and the Y-axis knob with the shift between the directions of the X-axis and the Y-axis, which is displayed, being watched, characterized in that discrimination is made as to whether said operated knob is the X-axis knob or the Y-axis knob, a value of movement of the X-Y table in the axial direction of said operated knob is calculated on the basis of the type of said knob operated, a value of displacement of the measurement element during the operation of the knob and a current angle of rotation of the X-Y table, and said shift is corrected on the basis of the value of movement of the X-Y table thus calculated, whereby said shift being displayed is renewed.

3. A method of measuring in a roundness measuring instrument as set forth in claim 2, wherein said discrimination as to whether said operated knob is the X-axis or the Y-axis knob is made in response to a detection signal when the X-Y table is rotated and the respective knobs reach predetermined angles of rotation relative to the detector.

4. A method of centering in a roundness measuring instrument as set forth in claim 2, wherein, when said predetermined angle of rotation is supposed to be $\theta$, $\theta$ is set in the range of $-45° < \theta < +45°$ or $135° < \theta < 225°$, a knob which reaches the predetermined angle of rotation $\theta$ first is discriminated as the X-axis knob and a knob which reaches the predetermined angle of rotation $\theta$ next is discriminated as the Y-axis knob.

5. A method of centering in a roundness measuring instrument, as set forth in claim 4, wherein, in said process of operating the X-axis knob and the Y-axis knob with the shift between the directions of the X-axis and the Y-axis, which is displayed, being watched, discrimination as to whether the operated knob is the X-axis or the Y-axis knob is made, a value of movement of the X-Y table in an axial direction of the operated knob is calculated on the basis of the type of knob operated, a value of displacement of the measurement element during the operation of the knob and the current angle of rotation of the detector, said shift is corrected on the basis of the value of movement of the X-Y table thus calculated and said shift being displayed is renewed.

6. A method of centering in a roundness measuring instrument as set forth in claim 5, wherein said discrimination as to whether the operated knob is the X-axis knob or the Y-axis knob is made in response to a detection signal when the detector is rotated and angles between the detector and the respective knobs reach predetermined angles of rotation.

7. A method of centering in a roundness measuring instrument as set forth in claim 6, wherein, when the predetermined angle of rotation is supposed to be $\theta$, $\theta$ is set in a range of $-45° < \theta < +45°$ or $135° < \theta < 225°$, a knob which reaches the predetermined angle of rotation $\theta$ first is discriminated as the X-axis knob and a knob which reaches the predetermined angle of rotation $\theta$ next is discriminated as the Y-axis knob.

8. A method of centering in a roundness measuring instrument as set forth in claim 1, wherein the shift of the center of the article to be measured between the directions of the X-axis and the Y-axis on the X-Y table from the center of rotation of the X-Y table and an average circle of the article to be measured are sought, and an output signal of the detector is set such that the position of the detector becomes zero when the measurement element is present on the radius of said average article.

9. A method of centering in a roundness measuring instrument, which is applied to the roundness measuring instrument, in which an article to be measured is rested on an X-Y table provided on a main body, a measurement element of a detector is abutted against the article to be measured and the detector is rotated and the roundness of the article to be measured is measured in response to a signal of displacement of the measurement element, wherein an X-axis knob and a Y-axis knob, which are provided on the X-Y table, are operated such that the X-Y table is moved in directions of an X-axis and a Y-axis, whereby the center of the article to be measured is made to coincide with the center of rotation of the detector, wherein said method comprises the steps of:

abutting the measurement element against the article to be measured, making the detector to be rotated one turn or more and seeking a shift of the center of the article to be measured between the directions of the X-axis and the Y-axis on the X-Y table from the center of rotation of the detector in response to the signal of displacement obtained during the rotation in accordance with the relationships:

$\Delta X = R \cos(\theta 1 - \theta_x)$ and $\Delta Y = R \sin(\theta 1 - \theta_y)$ where R is a radial value of eccentricity measured along a line between the center of the article to be measured and the center of the X-Y table, $\theta 1$ is an angle of eccentricity of the article relative to the X-Y table measured between said line and the measuring element of the detector, $\theta_x$ is an angle of the detector between the X-axis of the X-Y table and the measuring element of the detector, $\theta_y$ is an angle of the detector between the Y-axis of the X-Y table and the measuring element of the detector, and $\Delta X$ and $\Delta Y$ are the shifts of the center of the article to be measured relative to the center of rotation of the detector along the X-axis and Y-axis, respectively;

displaying the shift of the center of the article to be measured between the directions of the X-axis and the Y-axis on the X-Y table from the center of rotation of the detector; and operating the X-axis knob and the Y-axis knob with the shift between the X-axis and the Y-axis, which is displayed, being watched; whereby the centering of the article to be measured is performed by only a single operation of each of the X-axis and Y-axis knobs on an individual basis.

10. A method of centering in a roundness measuring instrument as set forth in claim 9, wherein a shift of the center of the article to be measured between the directions of the X-axis and the Y-axis on the X-Y table from the center of rotation of the detector is sought, an average circle of the article to be measured is sought, and an output signal of the detector is set such that a position of the detector becomes zero when the measurement element is present on the radius of the average circle.

11. A system for centering in a roundness measuring instrument, which is applied to the roundness measuring instrument, in which an article to be measured is rested on an X-Y table rotatably provided on a main body, a measurement element of a detector is abutted against the article to be measured and the article to be measured is rotated through the X-Y table to measure the roundness of the article to be measured on the basis of a position of displacement of the measurement element, wherein an X-axis knob and a Y-axis knob, which are provided on the X-Y table, are operated such that the X-Y table is moved in directions of an X-axis and a Y-axis, whereby the center of the article to be measured is made to coincide with the center of rotation of the X-Y table, said system comprising:

a computing section for rotating the X-Y table with the article to be measured one turn or more rested thereon and seeking a shift of the center of the article to be measured between the directions of the X-axis and the Y-axis on the X-Y table from the center of rotation of the X-Y table on the basis of a signal of the displacement obtained during the rotation;

a display section for displaying the shift of the center of the article to be measured between the directions of the X-axis and the Y-axis on the X-Y table from the center of rotation of the X-Y table;

an X-axis knob for moving the X-Y table in the direction of the X-axis; and a Y-axis knob for moving the X-Y table in the direction of the Y-axis;

wherein the computing and displaying section coact with the movement of the X-Y table in a manner enabling centering of the article to be produced by only a single operation of the X-axis and Y-axis knobs on an individual basis.

12. A system for centering in a roundness measuring instrument as set forth in claim 11, wherein:

said computing section calculates a value of movement of the X-Y table in an axial direction of the operated knob on the basis of the type of the operated knob, which is output from a discriminating means for discriminating as to whether the operated knob is the X-axis knob or the Y-axis knob, a value of displacement of the measurement element during the operation of the knob and the current angle of rotation of the X-Y table, and corrects the shift on the basis of the value of movement of the X-Y table thus calculated; and said display section renews the shift being displayed on the basis of the shift thus corrected.

13. A system for centering in a roundness measuring instrument as set forth in claim 11, wherein said discriminating means for discriminating as to whether the operated knob is the X-axis knob or the Y-axis knob outputs a detection signal when the respective knob reaches the predetermined angle of rotation relative to the detector.

14. A system for centering in a roundness measuring instrument as set forth in claim 11, wherein, when the predetermined angle of rotation is supposed to be $\theta$, $\theta$ is set in the range of $-45° < \theta < +45°$ or $135° < \theta < 225°$, a knob which reaches the predetermined angle of rotation $\theta$ first is discriminated as the X-axis knob and a knob which reaches the predetermined angle of rotation $\theta$ next is discriminated as the Y-axis knob.

15. A system for centering in a roundness measuring instrument as set forth in claim 11, wherein an output signal of the detector is set such that the position of the detector becomes zero when the measurement element is present on the radius of the average circle of the article to be measured.

16. A system for centering in a roundness measuring instrument, which is applied to the roundness measuring instrument, in which an article to be measured is rested on an X-Y table rotatably provided on a main body, a measurement element of a detector is abutted against the article to be measured and the article to be measured is rotated to measure the roundness of the article to be measured in response to a displacement signal of the measurement element, wherein an X-axis knob and a Y-axis knob, which are provided on the X-Y table, are operated such that the X-Y table is moved in directions of an X-axis and a Y-axis, whereby the center of the article to be measured is made to coincide with the center of rotation of the X-Y table, characterized in that said system comprises:

a computing section for abutting the measurement element against the article to be measured, making the X-Y table, with the article to be measured rested thereon, to be rotated one turn or more and seeking a shift of the center of the article to be measured between the directions of the X-axis and the Y-axis on the X-Y table from the center of rotation of the X-Y table in response to the displacement signal obtained during the rotation in accordance with the relationships:

$$\Delta X = R \cos(\theta 1 - \theta_x) \text{ and } \Delta Y = R \sin(\theta 1 - \theta_y)$$

where R is a radial value of eccentricity measured along a line between the center of the article to be measured and the center of the X-Y table, $\theta 1$ is an angle of eccentricity of the article relative to the X-Y table measured between said line and the measuring element of the detector, $\theta_x$ is an angle of the detector between the X-axis of the X-Y table and the measuring element of the detector, $\theta_y$ is an angle of the detector between the Y-axis of the X-Y table and the measuring element of the detector, and $\Delta X$ and $\Delta Y$ are the shifts of the center of the article to be measured relative to the center of rotation of the X-Y table along the X-axis and Y-axis, respectively;

a display section for displaying the shift of the center of the article to be measured between the directions of the X-axis and the Y-axis on the X-Y table from the center of rotation of the detector;

an X-axis knob for moving the X-Y table in the direction of the X-axis; and a Y-axis knob for moving the X-Y table in the direction of the Y-axis;

wherein the computing and displaying section coact with the movement of the X-Y table in a manner enabling centering of the article to be produced by only a single operation of the X-axis and Y-axis knobs on an individual basis.

17. A system for centering in a roundness measuring instrument as set forth in claim 16, wherein:

said computing section calculates a value of movement of the X-Y table in the direction of the axis of the operated knob on the basis of the type of the operated knob, which is output from a discriminating means for discriminating as to whether the operated knob is the X-axis knob or the Y-axis knob, a value of displacement of the measurement element during the operation of the knob and the current angle of rotation of the X-Y table, and corrects the shift on the basis of the value of movement of the X-Y table thus calculated; and said display section renews the shift being displayed on the basis of the corrected shift.

18. A system for centering in a roundness measuring instrument as set forth in claim 17, wherein, in said discriminating means for discriminating as to whether the operated knob is the X-axis knob or the Y-axis knob, detection signals are output when the detector reaches predetermined angles of rotation to the respective knobs.

19. A system for centering in a roundness measuring instrument as set forth in claim 18, wherein, when the predetermined angle of rotation is supposed to be $\theta$, $\theta$ is set in a range of $-45° < \theta < +45°$ or $135° < \theta < 225°$, a knob coincides with the predetermined angle of rotation $\theta$ first is discriminated as the X-axis and a knob coincides with the predetermined angle of rotation next is discriminated as the Y-axis.

20. A system for centering in a roundness measuring instrument as set forth in claim 16, wherein, in said computing section, an output signal of the detector is set such that the position of the detector becomes zero when the measurement element is present on the radius of an average circle of the article to be measured.

* * * * *